(12) United States Patent
Watanabe et al.

(10) Patent No.: US 11,693,175 B2
(45) Date of Patent: Jul. 4, 2023

(54) BRAIDER AND METHOD OF MANUFACTURING FLEXIBLE WAVEGUIDE

(71) Applicants: OLYMPUS CORPORATION, Hachioji (JP); FUKUI PREFECTURAL GOVERNMENT, Fukui (JP)

(72) Inventors: Tadashi Watanabe, Nagano (JP); Keigo Ito, Shirakawa (JP); Shinji Suesada, Fukui (JP); Tetsuhiko Murakami, Sakai (JP)

(73) Assignees: OLYMPUS CORPORATION, Tokyo (JP); FUKUI PREFECTURAL GOVERNMENT, Fukui (JP)

( * ) Notice: Subject to any disclaimer, the term of this patent is extended or adjusted under 35 U.S.C. 154(b) by 0 days.

(21) Appl. No.: 17/750,657

(22) Filed: May 23, 2022

(65) Prior Publication Data

US 2022/0283357 A1    Sep. 8, 2022

Related U.S. Application Data

(63) Continuation of application No. PCT/JP2020/039610, filed on Oct. 21, 2020.

(30) Foreign Application Priority Data

Jan. 17, 2020  (JP) ................. 2020-005964

(51) Int. Cl.
*F21V 8/00*      (2006.01)
*G02B 6/02*      (2006.01)

(52) U.S. Cl.
CPC ....... *G02B 6/0065* (2013.01); *G02B 6/02319* (2013.01)

(58) Field of Classification Search
CPC . G02B 6/0065; G02B 6/02319; H01P 11/001; H01P 5/12; H01P 13/00; H01P 13/0003; H01P 13/0036; H01P 3/00
See application file for complete search history.

(56) References Cited

U.S. PATENT DOCUMENTS 8,356,924 B2 *  1/2013  Fukui ................. A61B 1/00096
                                                            362/556
8,857,304 B2 * 10/2014  Govari ................ A61B 5/6885
                                                              87/13

(Continued)

FOREIGN PATENT DOCUMENTS

JP      2012115678 A       6/2012
JP      2015185858 A      10/2015

(Continued)

OTHER PUBLICATIONS

International Search Report (ISR) (and English language translation thereof) dated Dec. 28, 2020, issued in International Application No. PCT/JP2020/039610.

*Primary Examiner* — Andrew Jordan
(74) *Attorney, Agent, or Firm* — Holtz, Holtz & Volek PC

(57) ABSTRACT

A braider includes: a plurality of cylindrical bobbins around which flat foil yarns are wound so as not to be inverted; a plurality of carriers to which the bobbins are rotatably attached, the plurality of carriers being configured to feed out the flat foil yarns from the bobbins; a core material supply mechanism configured to supply a core material to be placed inside the outer conductor; a waveguide take-out mechanism configured to take out the flexible waveguide after the outer conductor is formed; and a carrier movement determination mechanism configured to determine movement of the carriers so that there are always three or more cross points formed by the individual flat foil yarns with (Continued)

other ones of the flat foil yarns in an enlarged portion before the flat foil yarns form a braided shape.

15 Claims, 12 Drawing Sheets

(56) References Cited

U.S. PATENT DOCUMENTS

| | | | |
|---|---|---|---|
| 8,948,556 B2 * | 2/2015 | Yu | G02B 6/4416 385/101 |
| 9,417,416 B2 * | 8/2016 | Yasuda | G02B 6/4416 |
| 9,628,143 B2 | 4/2017 | Okada | |
| 10,173,028 B2 * | 1/2019 | Govari | A61M 25/0127 |
| 10,249,412 B2 * | 4/2019 | Watanabe | A61B 1/00114 |
| 11,045,069 B2 * | 6/2021 | Ito | H01P 3/122 |
| 2012/0143044 A1 | 6/2012 | Govari et al. | |
| 2014/0079359 A1 * | 3/2014 | Yu | G02B 6/44 385/101 |
| 2014/0321822 A1 * | 10/2014 | Yasuda | G02B 6/4416 385/101 |
| 2014/0378806 A1 | 12/2014 | Govari et al. | |
| 2016/0056860 A1 * | 2/2016 | Okada | H01P 3/14 375/257 |
| 2018/0151272 A1 * | 5/2018 | Watanabe | A61B 1/00114 |
| 2020/0060513 A1 | 2/2020 | Ito et al. | |
| 2022/0283357 A1 * | 9/2022 | Watanabe | G02B 6/0065 |
| 2022/0285815 A1 * | 9/2022 | Watanabe | H01P 1/042 |

FOREIGN PATENT DOCUMENTS

| | | |
|---|---|---|
| JP | 2015187319 A | 10/2015 |
| JP | 2017147548 A | 8/2017 |
| JP | 6343827 B2 | 6/2018 |
| JP | 2018191137 A | 11/2018 |
| WO | 2014162833 A1 | 10/2014 |

* cited by examiner

BRAIDER AND METHOD OF MANUFACTURING FLEXIBLE WAVEGUIDE

CROSS-REFERENCE TO RELATED APPLICATION

This application is a continuation of PCT international application Ser. No. PCT/JP2020/039610, filed on Oct. 21, 2020 which designates the United States, incorporated herein by reference, and which claims the benefit of priority from Japanese Patent Applications No. 2020-005964, filed on Jan. 17, 2020, incorporated herein by reference.

BACKGROUND

1. Technical Field

The present disclosure relates to a braider and a method of manufacturing a flexible waveguide.

2. Related Art

In recent years, starting with the broadcasting field, efforts toward creating high-definition video represented by 4K/8K images have been widely made. In high-definition video represented by 4K/8K images, the capacity of video information is large due to an increase in the number of pixels, so a communication speed of several tens of Gbps or more is required.

However, it has been difficult for the metal wire transmission method, which has been widely used in short-distance information transmission, to support a communication speed of several tens of Gbps or more. Specifically, it has been difficult for a transmission method using a coaxial line, a twisted pair line, a twin-ax line, or the like to support a communication speed of several tens of Gbps or more.

For transmission of large-capacity information such as high-definition video, it is conceivable to use the optical communication technology conventionally used for long-distance transmission or high-speed communication in a data center. However, the transmission/reception unit used in the optical communication technology is very expensive. For this reason, there is an economic problem in which it is difficult to adopt the transmission/reception unit as a communication means in short-distance information communication, especially for products in the popular price range.

Further, the optical communication transmission/reception unit requires a connection technology with a high accuracy of about several μm for line connection, and communication may be interrupted only by fine dust adhering to a connection surface. For this reason, the optical communication transmission/reception unit has a problem in which it is difficult to secure reliability, especially in a product in which repeated connections are made. That is, the optical communication technology cannot be widely used as an alternative to the conventional metal wire transmission method used in short-distance communication, and thus has not been widespread despite high needs for high-speed communication.

Under these circumstances, a communication method for high-speed communication by millimeter waves using a flexible waveguide has been developed as a wired communication means that can realize high-speed communication of several tens of Gbps or more at low cost and at a high level of connection reliability.

For example, Japanese Unexamined Patent Publication No. 2017-147548 proposes a flexible waveguide including a hollow first tubular dielectric, a tubular conductor arranged on the outer periphery of the first tubular dielectric, and a second tubular conductor arranged on the outer periphery of the tubular conductor.

Further, International Publication No. 2014/162833 proposes a flexible waveguide including a hollow tubular dielectric, a metal plating layer covering two surfaces where electric fields intersect, and a protective layer surrounding a dielectric including the two surfaces covered with the metal plating layer.

Further, Japanese Patent No. 6343827 proposes a flexible waveguide including a rod-shaped dielectric arranged in a center and an outer conductor where flat foil yarns are braided on the outer surface of the dielectric.

The present inventor pays particular attention to the flexible waveguide disclosed in Japanese Patent No. 6343827 among the above-mentioned flexible waveguides, and is proceeding with diligent research because the flexible waveguide is particularly highly practical.

SUMMARY

In some embodiments, provided is a braider of forming an outer conductor of a flexible waveguide by braiding flat foil yarns that are obtained by slitting a composite film composed of a metal foil and a resin film with a constant cutting width. The braider includes: a plurality of cylindrical bobbins around which the flat foil yarns are wound so as not to be inverted; a plurality of carriers to which the bobbins are rotatably attached, the plurality of carriers being configured to feed out the flat foil yarns from the bobbins; a core material supply mechanism configured to supply a core material to be placed inside the outer conductor; a waveguide take-out mechanism configured to take out the flexible waveguide after the outer conductor is formed; and a carrier movement determination mechanism configured to determine movement of the carriers so that there are always three or more cross points formed by the individual flat foil yarns with other ones of the flat foil yarns in an enlarged portion before the flat foil yarns form a braided shape.

In some embodiments, provided is a method of manufacturing a flexible waveguide including a flexible dielectric rod and an outer conductor, the outer conductor being formed by braiding flat foil yarns on an outer periphery of the flexible dielectric rod. The method includes: forming the outer conductor using the braider; and matching front and back sides of the flat foil yarns before the forming of the outer conductor.

In some embodiments, provided is a method of manufacturing a flexible waveguide including a flexible dielectric rod and an outer conductor, the outer conductor being formed by braiding flat foil yarns on an outer periphery of the dielectric rod. The method includes: forming the outer conductor using the braider; and adjusting tension of the flat foil yarns before the forming of the outer conductor.

In some embodiments, provided is a braider of forming a cylindrical member by braiding a plurality of strip members. The braider includes: a plurality of cylindrical bobbins around which the strip members are wound so as not to be inverted; a plurality of carriers to which the bobbins are rotatably attached, the plurality of carriers being configured to feed the strip members out from the bobbins; and a carrier movement determination mechanism configured to determine movement of the plurality of carriers so that there are always three or more cross points formed by the individual strip members with other ones of the strip members in an enlarged portion before the strip members form a braided shape.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1 is a flowchart illustrating a process of a method of manufacturing a flexible waveguide;

DETAILED DESCRIPTION

Hereinafter, embodiments for carrying out the present disclosure will be described in detail with reference to the drawings. The present disclosure is not limited to the following embodiments. In addition, each of the figures referred to in the following description merely schematically illustrates the shape, size, and positional relationship to the extent that the contents of the present disclosure can be understood. That is, the present disclosure is not limited to the shape, size, and positional relationship exemplified in each figure.

First Example

Configuration of Braider

Figure 1:
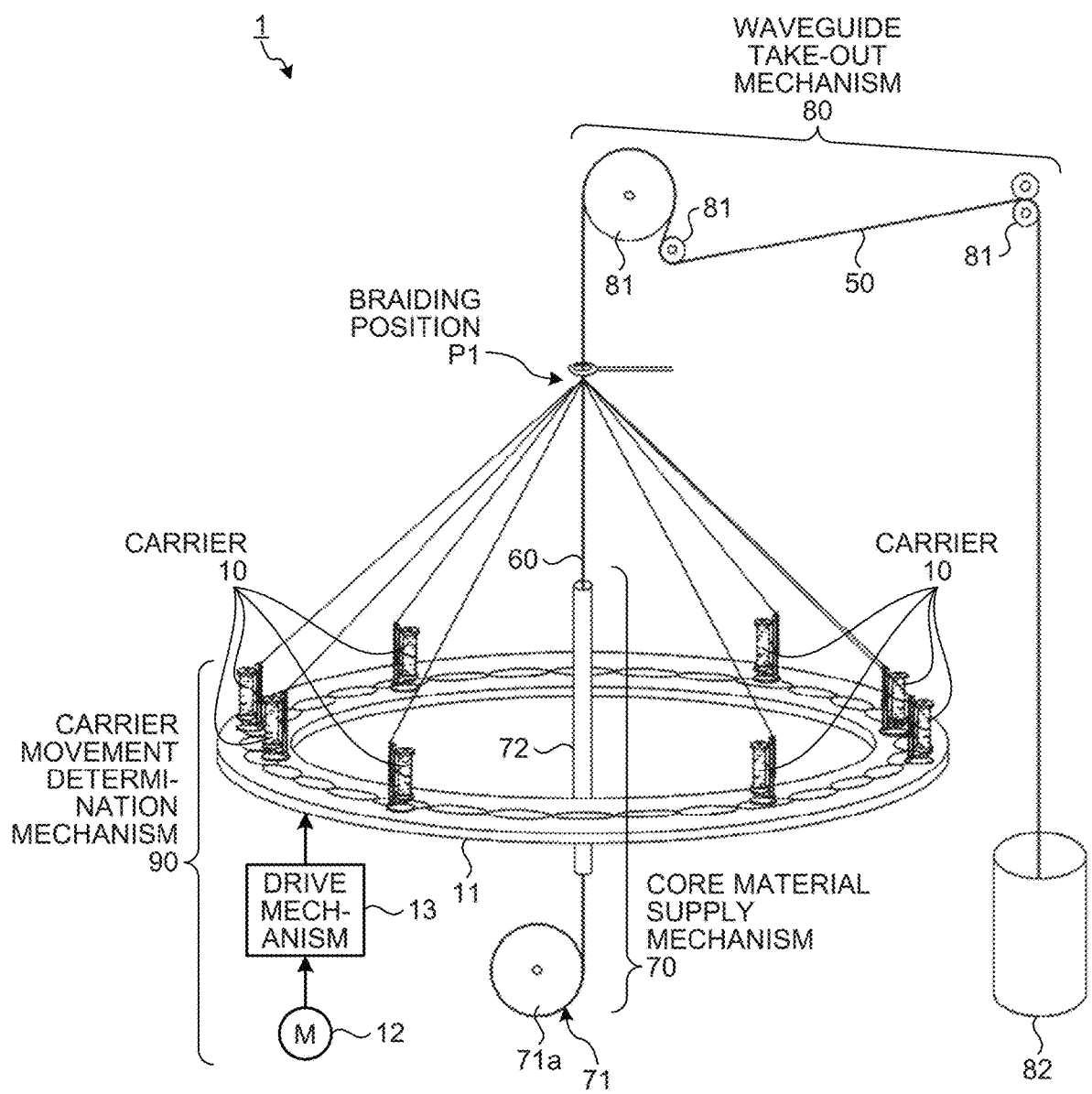
FIG. 1 is a schematic configuration diagram of a braider.
Figure 2:
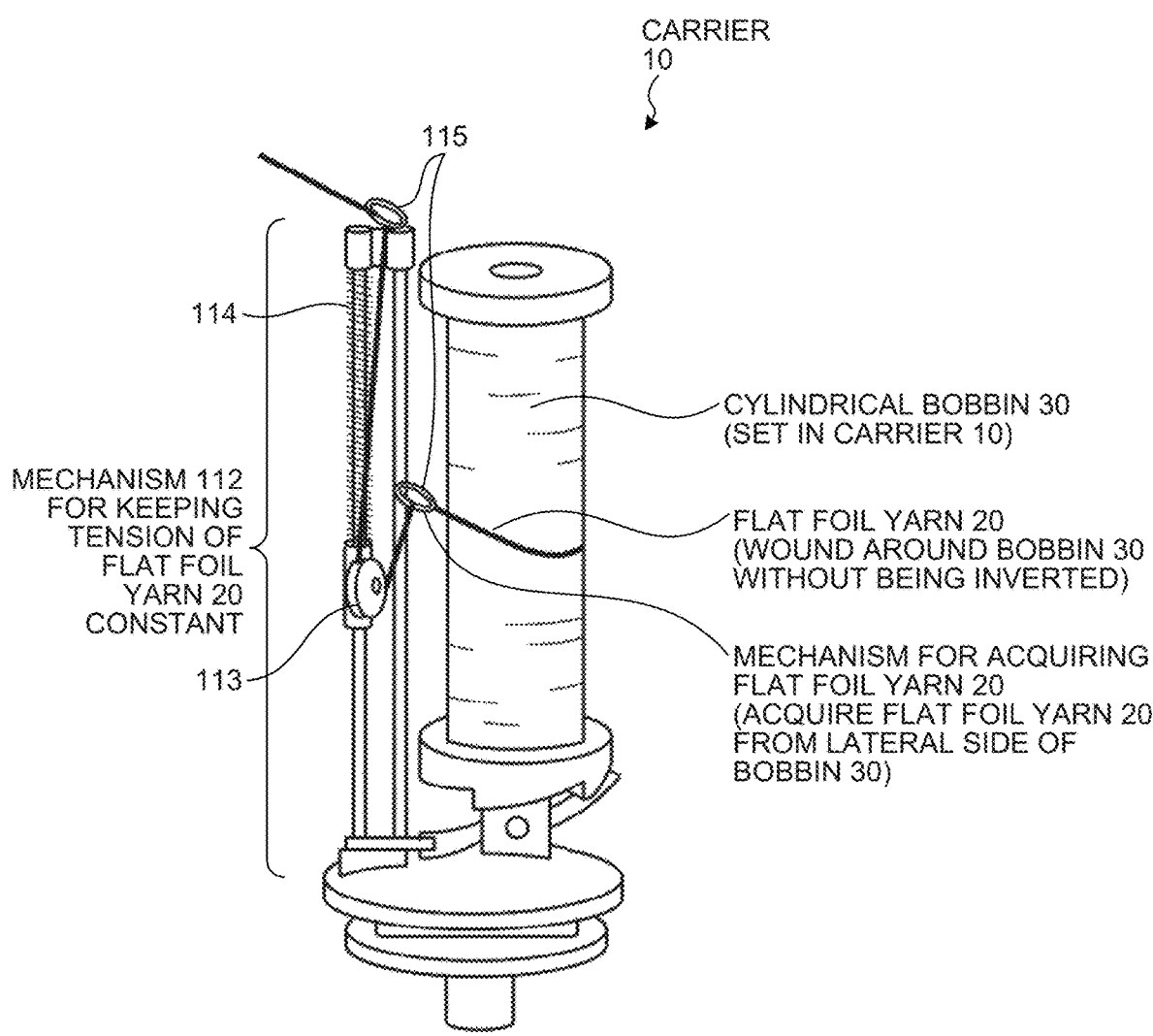
FIG. 2 is an enlarged view of a carrier in which a bobbin is set in the braider.

First, a configuration of a braider will be described. FIG. 1 is a schematic configuration diagram of the braider. FIG. 2 is an enlarged view of a carrier in which a bobbin is set in the braider.

A braider 1 illustrated in FIG. 1 is a braider that can use up to 64 of carriers 10. In this braider 1, eight of the carriers 10 are set each including a cylindrical bobbin 30 that is rotatably set and around which a flat foil yarn 20 is wound so as not to be inverted, a core material supply mechanism 70 for supplying a core material 60 to be placed inside a waveguide 50, and a waveguide take-out mechanism 80 for winding the waveguide 50 at a constant speed after an outer conductor is formed are installed so as to configure a braider for a waveguide outer conductor.

Movement. of the carriers 10 is determined by a rail 11 of the braider 1, a drive motor 12, and a drive mechanism 13 arranged under the rail 11. The rail 11, the drive motor 12, and the drive mechanism 13 determine the carrier movement in combination and function as a carrier movement determination mechanism 90.

As illustrated in FIG. 2, each of the carriers 10 is configured to acquire the flat foil yarn 20 from a lateral side of the cylindrical bobbin 30 when the flat foil yarn 20 is fed out from the cylindrical bobbin 30. Also, the flat foil yarn 20 is manufactured by continuously cutting a composite film obtained by laminating a polyimide film having a thickness of 25 μm and a copper foil having a thickness of 9 μm, to a width of 1.2 mm by a slitter having a plurality of rotary blades, and has a smooth cut surface. That is, the flat foil yarn 20 in this example has a smooth surface in which a smooth film surface and the smooth cut surface are reflected.

The core material supply mechanism 70 includes a core material feeding mechanism 71 on a lower side of the rail 11 and a feed pipe 72 that determines a feeding position of the core material 60. The core material 60 to be placed inside the waveguide 50 is wound around a cylindrical drum 71a included in the core material feeding mechanism 71, and is supplied from here near a position where a braiding is made through the feed pipe 72.

The waveguide take-out mechanism 80 pulls up the waveguide 50 where the formation of the outer conductor is completed, and takes out the waveguide 50 as a finished product through several pulleys 81. Here, the finished product is dropped into a box 82 via the pulleys 81 so as to be collected, but a collection mechanism such as winding the finished product around a cylindrical drum may be used. The waveguide take-out mechanism 80 interlocks with the carrier movement determination mechanism 90, and performs an operation of pulling up the waveguide 50 where the formation of the outer conductor is completed, together with a braiding operation.

Figure 3:
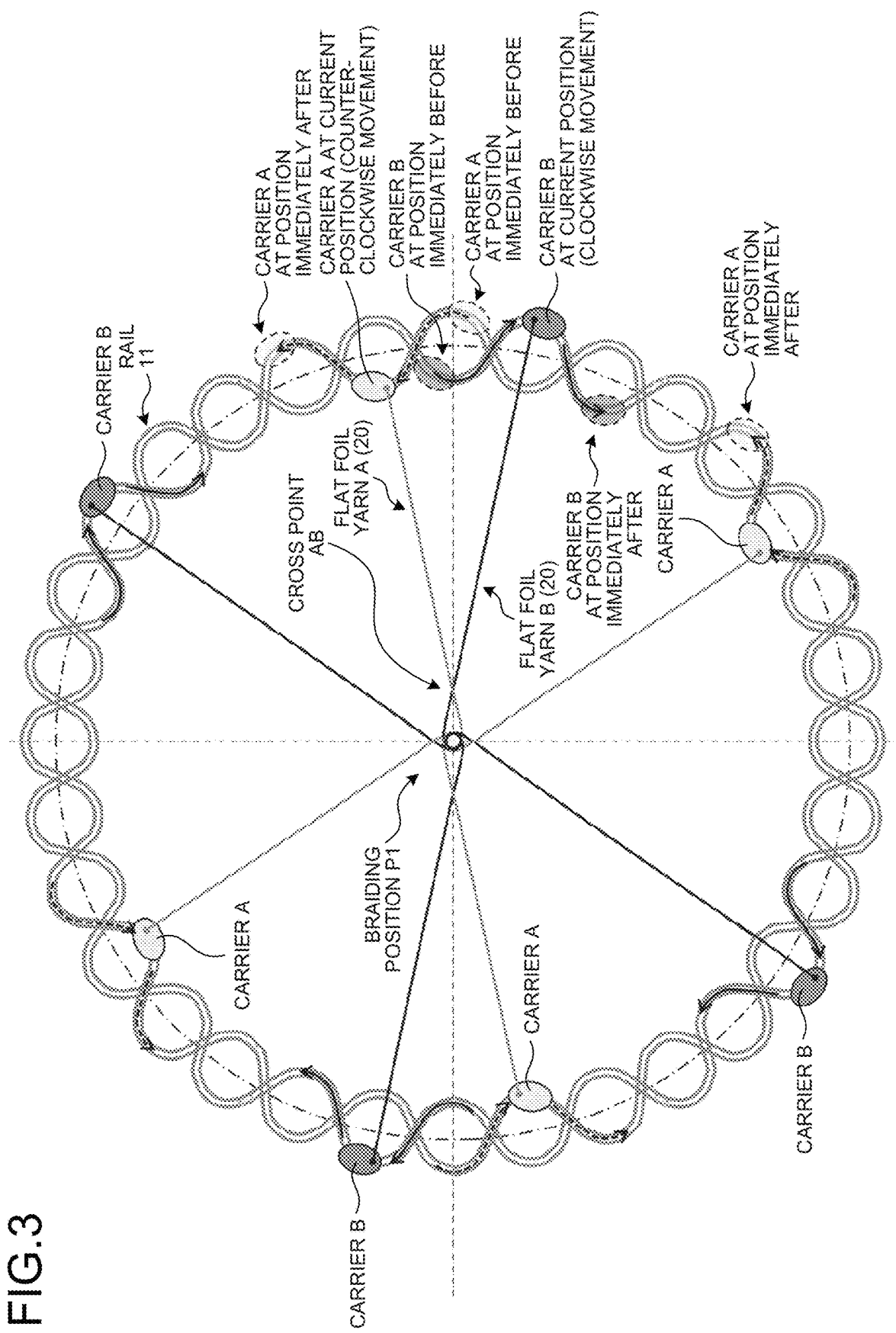
FIG. 3 is a conceptual diagram when the braider illustrated in FIG. 1 is viewed from above, and is a conceptual diagram illustrating a rail of the braider and paths for the carriers move on the rail.

FIG. 3 is a conceptual diagram when the braider 1 illustrated in FIG. 1 is viewed from above, and is a conceptual diagram illustrating the rail 11 included in the braider 1 and paths for carriers to move on the rail 11.

The rail 11 includes a rail for clockwise rotation and a rail for counterclockwise rotation, and these rails have tracks that make one rotation around a braiding position while crossing each other, the braiding position being a position at which flat foil, yarns are braided. Eight of the carriers 10 include four of the carriers 10 that rotate counterclockwise (hereinafter referred to as "carriers A") and four of the carriers 10 that rotate clockwise (hereinafter referred to as "carriers B"), the flat foil yarn 20 is stretched from each of the carriers toward the braiding position, and the carriers move on the rail 11. The carriers 10 are arranged as illustrated in FIG. 3, and the carriers A and the carriers B move on the rail 11 while meandering by crossing tracks of the rail 11.

The flat foil yarn 20 is pulled out, from each carrier 10 arranged on the rail 11, and the flat foil yarn 20 is supplied to the braiding position P1. Each carrier 10 includes a mechanism 112 (see FIG. 2) that keeps tension of the flat foil yarn 20 constant, thereby keeping the tension of all the flat foil yarns 20 constant. The tension of the flat foil yarns 20 is determined by the balance between force of pulling the flat foil yarns 20 by the mechanisms 112 that are included in the carriers 10 and that keep the tension constant, and force of pulling the flat foil yarns 20 from the braiding position P1 by the movement of the carriers 10. The carriers 10 used in this example each include a vertically movable pulley mechanism 113 and a spring 114 that supports the pulley mechanism 113, and a weight of the vertically movable pulley mechanism 113 and a spring constant of the spring 114 are kept constant so as to keep the tension constant. The mechanism for keeping the tension constant is not limited to the mechanism used in this example, and other mechanisms can be used.

Action of Braider

Figure 4A:
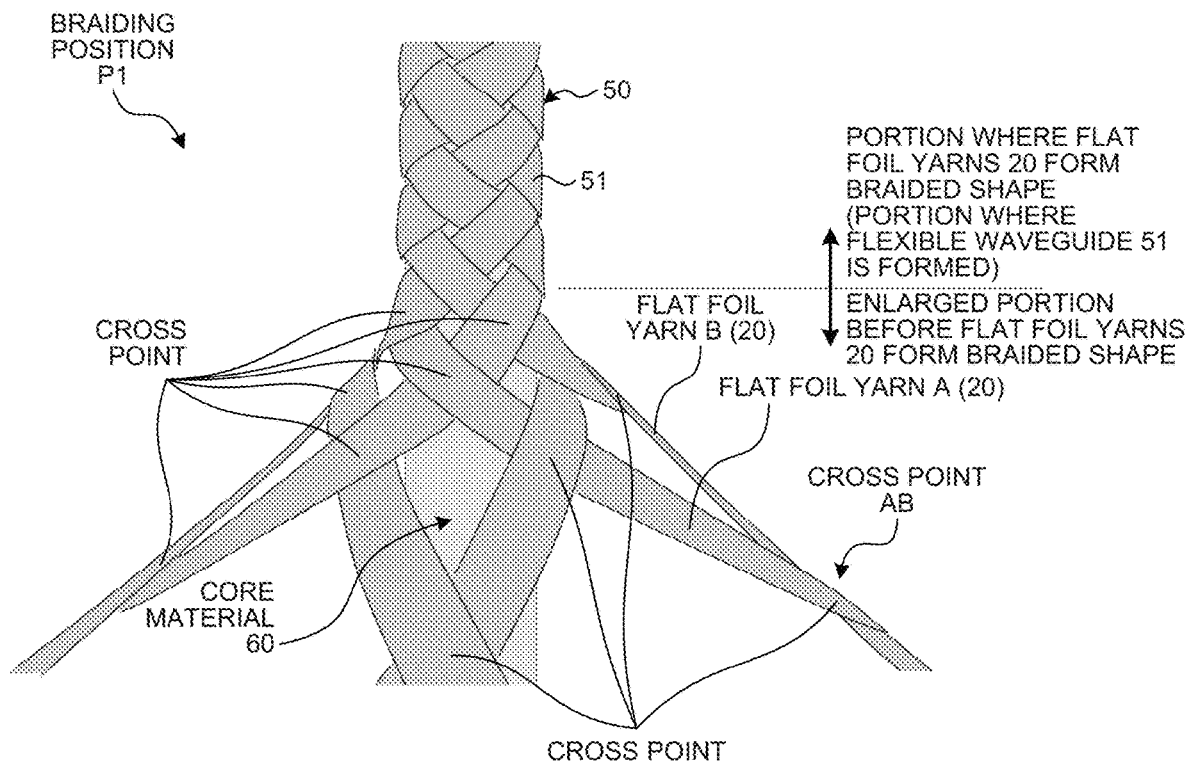
FIG. 4A is a schematic view when a braiding position is enlarged, and is a schematic view illustrating an appearance when the carriers are at positions illustrated in FIG. 3.
Figure 4B:
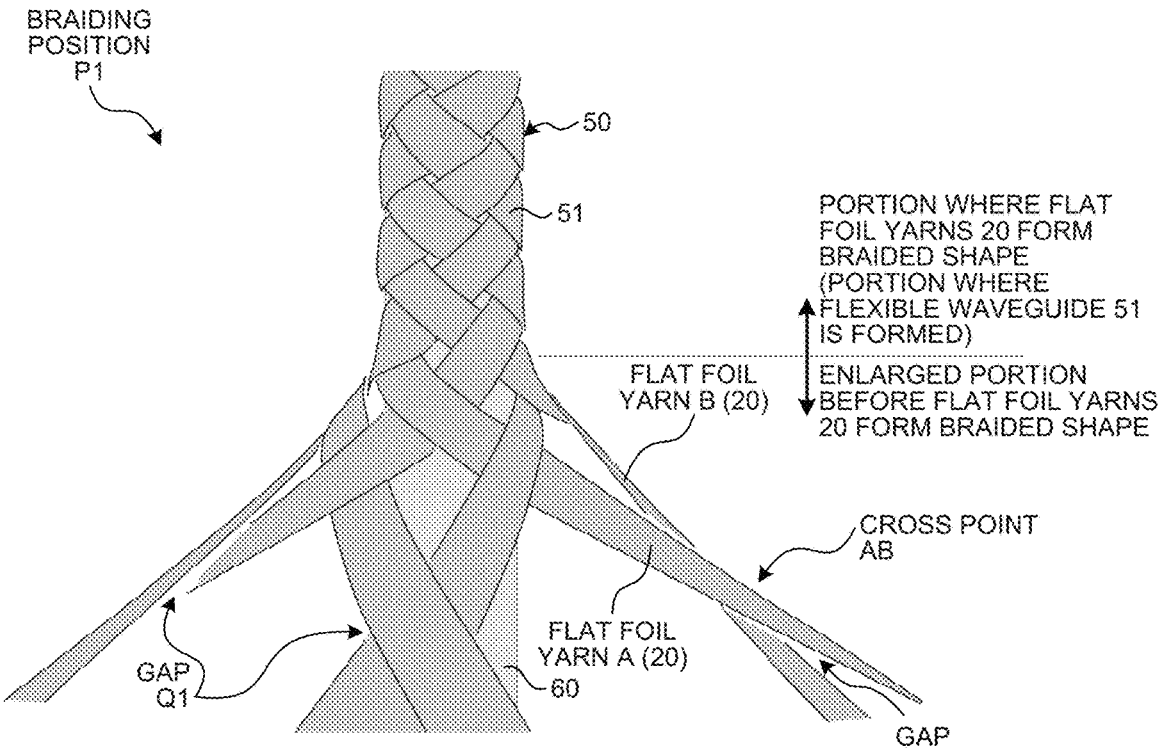
FIG. 4B is a schematic view when the braiding position is enlarged, and is a schematic view illustrating an appearance immediately after the carriers are at the positions illustrated in FIG. 3.
Figure 5:
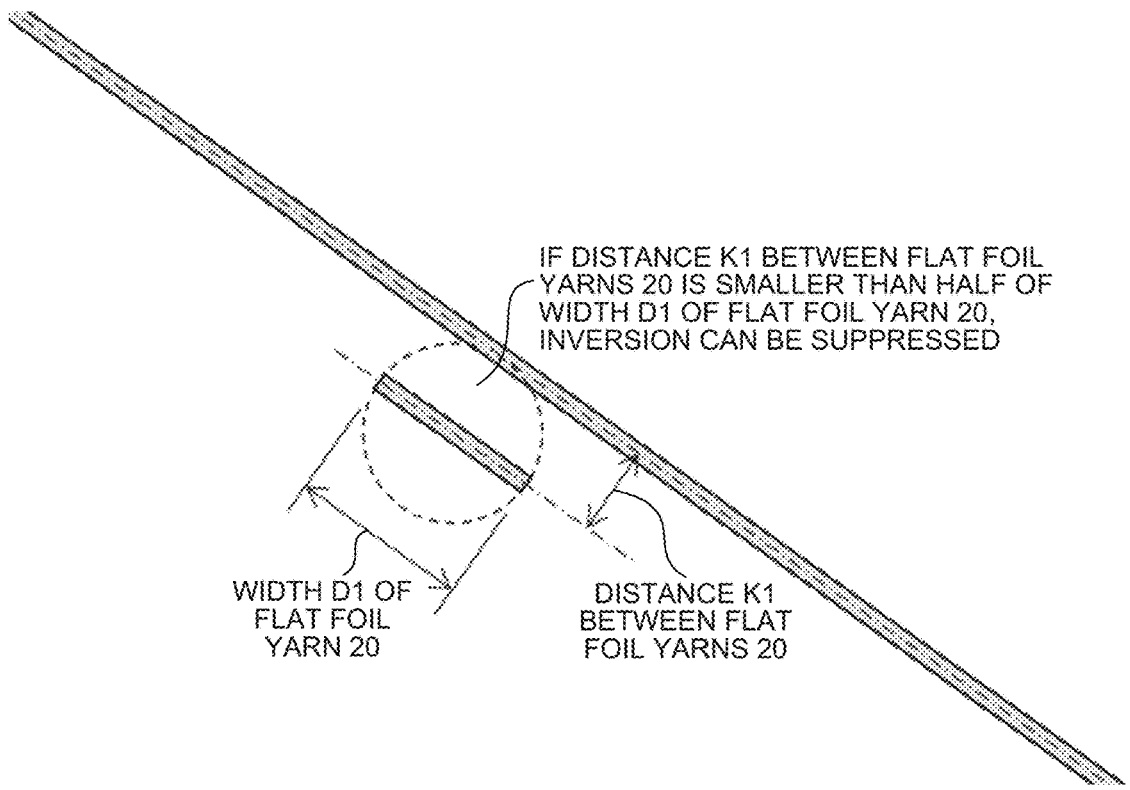
FIG. 5 is a diagram schematically illustrating an outline in which inversion can be suppressed if a distance between flat foil yarns is smaller than half a width of each of the flat foil yarns.

Next, formation of an outer conductor of a flexible waveguide by the braider 1 will be described with reference to FIGS. 3, 4A, 4B, and 5. Here, it will be described that according to the braider 1, the outer conductor of the flexible waveguide having a braided structure can be formed without inverting front and back sides of the flat foil yarns 20, and characteristics of the flexible waveguide can be sufficiently stabilized. FIG. 4A is a schematic view when the braiding position P1 is enlarged, and illustrates an appearance when the carriers 10 are at the positions (current positions) illustrated in FIG. 3. FIG. 4B is also a schematic view when the braiding position P1 is enlarged, and is a schematic view illustrating the appearance when the carriers 10 are at positions immediately after illustrated in FIG. 3 (immediately after FIG. 4A). FIG. 5 is a diagram schematically illustrating an outline in which inversion can be suppressed if a distance between the flat foil yarns 20 is smaller than half a width of each of the flat foil yarns 20.

Braiding Operation

First, an operation during formation of an outer conductor will be described with reference to FIGS. 3, 4A, and 4B.

When a cross point or a flat foil yarn A and a flat foil yarn B in FIG. 3 is set as a cross point AB, the cross point AB is generated in the following way. That is, the cross point AB is generated when one of the carriers A and one of the carriers B on the right side in FIG. 3 are moving from positions immediately before to current positions, with the flat foil yarn 20 (hereinafter referred to as "flat foil yarn A") pulled out from the one of the carriers A covering over the flat foil yarn 20 (hereinafter referred to as "flat foil yarn B") pulled out from the one of the carriers B.

When the one of the carriers A and the one of the carriers B are in the current positions as illustrated in FIG. 3, the one of the carriers A is on an inner side than the one of the carriers B (near the braiding position P1), so that the flat foil yarn A and the flat foil yarn B are in contact with each other at the cross point AB as illustrated in FIG. 4A. When the one of the carriers A and the one of the carriers B move from this state and reach positions immediately after as illustrated in FIG. 3, respectively, the one of the carriers A is different from the last time and is on an outer side than the one of the carriers B (a position away from the braiding position P), as illustrated in FIG. 4B, at the cross point AB, a gap Q1 is generated between the flat foil yarn A and the flat foil yarn B.

As the carriers 10 move further, the one of the carriers A and another one of the carriers B cross each other again, and the flat foil yarn B pulled out from the other one of the carriers B covers over the flat foil yarn A pulled out from the one of the carriers A to form a new cross point. A flexible waveguide 51 (waveguide) is formed by repeating this movement. The flexible waveguide 51 is assembled such that the flat foil yarns 20 (flat foil yarns A and B) included in the flexible waveguide 51 to be formed are in contact with each other alternately on front and back sides of flat foil yarn.

During this movement, there is a possibility of inversion (of front and back sides) of the flat foil yarns 20 (flat foil yarns A and B) when the flat foil yarns 20 first cross each other and then come into contact with each other, or when a gap is created between the flat foil yarns 20. If force for suppressing inversion is not sufficiently exerted or a factor leading to the inversion of the flat foil yarns 20 is increased when the inversion can occur in the flat foil yarns 20, front and back inversion of the flat foil yarns 20 occurs.

Generation of Inversion Suppression Force by Interference Between Flat Foil Yarns 20 (Flat Foil Yarns A and B)

On the upper side of FIG. 4A, there is a braided portion of the flat foil yarns 20, that is, a portion where the flexible waveguide 51 has been formed, and the portion is pulled upward by the waveguide take-out mechanism 80. Further, on the lower side of the braiding position P1, the core material 60 for the waveguide supplied from the core material feeding mechanism 71 and the flat foil yarns 20 supplied from the carriers 10 are arranged. Here, the core material 60 for the waveguide extends straight down from the braiding position P1 due to a weight of the core material 60. The flat foil yarns 20 are pulled diagonally from the braiding position P1 at an angle of approximately 45° with respect to the core material 60 at a constant tension by the mechanisms 112 that are included in the carriers 10 and that keep the tension constant.

At the braiding position P1, force of pulling upward, the weight of the core material 60, and the tension of the flat foil yarns 20 antagonize (balance), and the braiding position P1 is fixed at a certain position by this antagonism (balance). Further, at the braiding position P1, an enlarged portion before the flat foil yarns 20 form a braided shape is formed. The enlarged portion before the flat foil yarns 20 form the braided shape has a shape in which the flat foil yarns 20 smoothly spread from the braided portion. The enlarged portion before the flat foil yarns 20 form the braided shape includes a plurality of cross points that later forms a braided shape. As illustrated in FIGS. 4A and 4B, the plurality of cross points in the enlarged portion exists in all of the flat foil yarns 20.

Looking at one of the flat foil yarns 20 in FIG. 4A, there a-re four cross points where the one of the flat foil yarns 20 is in contact with others of the flat foil yarns 20 at different positions. Taking the flat foil yarn A as an example, at a cross point (the innermost cross point) located on the innermost side (side of the core material 60) among the four cross points, a surface of the flat foil yarn A, which is in contact with another one of the flat foil yarns 20, is a surface that becomes an outer side after braiding. At an outer cross point adjacent to the innermost cross points among the four cross points, a surface of the flat foil yarn A, which becomes an inner side after braiding, is in contact with another one of the flat foil yarns 20. At a further outer cross point, an opposite side (a surface of the flat foil yarn A which becomes the outer side after braiding) is in contact with another one of the flat foil yarns 20, and at a cross point (cross point AB) that is the outermost cross point, an opposite side (a surface of the flat foil yarn A which becomes the inner side after braiding) is in contact with another one of flat foil yarns 20.

As illustrated here, since one of the flat foil yarns 20 is sandwiched between other the flat foil yarns 20 in order, the force for suppressing inversion of the flat foil yarns 20 is generated during braiding. That is, by strengthening the force for suppressing inversion, the front and back inversion of the flat foil yarns 20 can be suppressed. The cross point in the present disclosure is a point at a position where the flat foil yarns 20 (flat foil yarns A and B) are in contact with each other or are sufficiently close to each other, and is a relative position where the flat foil yarns 20 interfere with each other so as to obtain the force for suppressing inversion of the flat foil yarns 20.

Looking at the cross points in the flat foil yarn A in FIG. 4B, the cross point located on the innermost side (side of the core material 60) in FIG. 4A is almost following the core material 60, and is not in the enlarged portion.

In this way, the number of cross points in the enlarged portion changes depending on a timing of braiding. In addition, the innermost cross point in FIG. 4A in this case gives twisting force to the flat foil yarns 20 in a direction following the core material 60 at the timing of FIG. 4B, and at the timing of FIG. 4B, negative force (force for promoting inversion) is generated against the force for suppressing inversion caused by the flat foil yarns 20 (flat foil yarns A and B) overlapping on surfaces each other. That is, only the cross points in the enlarged portion suppress inversion.

As described above, the number of the cross points of the flat foil yarn A in FIG. 4B is reduced to three, but according to the present embodiment, inversion can be suppressed. As a result of diligent studies on various embodiments including this case, the present inventor has found that if there are at least three cross points in the enlarged portion, the force for suppressing inversion can be exerted and inversion can be suppressed.

As a result of further studies, the present inventor has identified more detailed requirements for exerting the force for suppressing inversion. That is, it has been found out that in order to obtain the force for suppressing inversion, it is necessary for the plurality of cross points to further satisfy the following three requirements on the premise of the above-mentioned requirements (there are at least three cross points in the enlarged portion).

First Inversion Suppression Requirement

There are at least two cross points where two flat foil yarns 20 (flat foil yarns A and B) that cross each other during the braiding operation are continuously in contact with each other at two or more points.

Second Inversion Suppression Requirement

At a next cross point outside the outermost cross point among the cross points where the two flat foil yarns 20 (flat foil yarns A and B) are continuously in contact with each other at two or more points, two flat foil yarns 20 (flat foil yarns A and B) crossing each other are in contact with each other or are located so that a distance K1 between the two flat foil yarns 20 crossing each other is less than approximately half of a width D1 (cutting width of the composite film) of each of the two flat foil yarns 20 crossing each other.

Third Inversion Suppression Requirement

The tension of all of the flat foil yarns 20 is at or above a certain level.

The above-mentioned first inversion suppression requirement is basic as force for suppressing inversion. Here, through sandwiching with two crossing flat foil yarns 20 from the opposite sides, the basic force for suppressing inversion is exerted. It is desirable that two crossing flat foil yarns 20 are in continuous contact with each other on surfaces as much as possible, but as a form close to this, if at one cross point, two crossing flat foil yarns 20 are continuously in contact with each other at at least two points, the force for suppressing inversion can be exerted.

The above-mentioned second inversion suppression requirement is a requirement to be satisfied by the cross point located further outside the cross point in the first requirement. This cross point corresponds to the cross point AB in FIGS. 4A and 4B. At this cross point, the flat foil yarns are attached to or separated from each other during braiding due to the meandering of the carriers. The present inventor has found that inversion of the flat foil yarns 20 is likely to occur when the flat foil yarns 20 come into contact with each other after being separated from each other, and it is important to suppress inversion of the flat foil yarns 20 at this cross point to obtain the flexible waveguide 51 in which the front and back sides of the flat foil yarns 20 are not inverted. Furthermore, the present inventor has found that in order to suppress inversion when the flat foil yarns 20 are separated from each other at this cross point, the flat foil yarns 20 should be close each at a distance of less than half of a width D1 of each of the flat foil yarns 20 at this cross point. This theory can be understood from a relatively simple geometrical consideration as illustrated in FIG. 5. At an actual cross point, since the flat foil yarns 20 (flat foil yarns A and B) do not cross each other at right angles, the flat foil yarns 20 are unlikely to be inverted, and if the flat foil yarns 20 are close each at a distance of less than half the width D1 of each of the flat foil yarns 20, inversion can be suppressed.

The above-mentioned third inversion suppression requirement is an incidental requirement, but is extremely important. This is because the "tension at or above a certain level" in the above-mentioned third requirement is indispensable in order to suppress inversion according to the above-mentioned first requirement and the above-mentioned second requirement.

Inversion Factors and Suppression or Inversion Factors

As already described, inversion occurs in the flat foil yarns 20 when the force for suppressing inversion is not exerted or a factor leading to inversion of the flat foil yarns 20 becomes stronger. That is, if force for promoting inversion exceeds the force for suppressing inversion, the front and back inversion of the flat foil yarns 20 occurs. Hereinafter, factors leading to inversion of the flat foil yarns 20 and a method for suppressing the inversion will be described.

The present inventor has found as a result of diligent research that the factors leading to inversion of the flat foil yarns 20 are summarized in the following three points. That is, the inversion of the flat foil yarns 20 can be suppressed by suppressing the occurrence of these three factors to the extent that the force for suppressing the inversion due to alternating contact of the flat foil yarns 20 (flat foil yarns A and B) is not exceeded.

First Inversion Factor

Twisting of the flat foil yarns 20 between the carriers 10 and the braiding position P1.

Second Inversion Factor

Vibration and twisting of the flat foil yarns 20 generated by the meandering of the carriers 10 along the track of the rail 11.

Third Inversion Factor

Vibration, umping, and twisting due to rubbing between the flat foil yarns 20 (flat foil yarns A and B).

The occurrence of the first inversion factor can be suppressed by setting the flat foil yarns 20 for the first time with a small amount of "twisting of the flat foil yarns 20". In addition to this, the occurrence of the first inversion factor can be suppressed by making the configuration in which the flat foil yarns 20 are acquired from lateral sides of the cylindrical bobbins 30 with the rotating cylindrical bobbins 30 when the flat foil yarns 20 are fed out from the cylindrical bobbins 30 as in the present embodiment. According to this configuration, the braiding operation can be advanced without increasing twisting of the flat foil yarns from the time when the flat foil yarns are first set. That is, in the form of acquiring yarns from upper sides of the cylindrical bobbins 30, which is used in many braiders, twisting of the yarns increases during the braiding operation.

Further, twisting of the flat foil yarns 20 between the carriers 10 and the braiding position P1 cannot be suppressed by all means when the flat foil yarns 20 have stress. This spontaneous twisting of the flat foil yarns 20 can be suppressed by suppressing internal stress of the flat foil yarns 20. For this purpose, the flat foil yarns 20 may be manufactured, like the flat f-oil yarns 20 used in this example, by slitting a composite film composed of a metal foil and a resin film with a constant cutting width to continuous cutting the composite film using a slitter having a plurality of rotary blades. That is, if the flat foil yarns 20 manufactured in this way are used, the internal stress of the flat foil yarns 20 is sufficiently suppressed, and the inversion factors of the flat foil yarns 20 are not strengthened.

In the present disclosure, the form in which the flat foil yarns 20 are obtained by continuous cutting the composite film with a constant cutting width using a slitter having a plurality of rotary blades is the most appropriate for the braider 1 of the round braid for a waveguide outer conductor. However, if there is a configuration or a cutting method that can obtain a smoother surface or a cut surface on the flat foil yarns 20 to be used, such a configuration or cutting method may be used.

The second inversion factor is caused by the vibration and twisting of the flat foil yarns 20 due to the meandering of the carriers 10 described in the explanation of the second inversion suppression requirement, and is unavoidable in a sense. The meandering of the carriers 10 causes the flat foil yarns 20 to vibrate flutteringly, and when the vibration is strengthened, the front and back sides of the flat foil yarns 20 are inverted. However, in addition to this, the present inventor has further examined the factors that cause inversion by considering both of the inversion suppression requirements described in the explanation of the second inversion suppression requirement, and the above-mentioned timing of inversion occurrence (inversion is likely to occur when the flat foil yarns 20 come into contact with each other after being separated from each other).

Here, the present inventor has considered a magnitude of an angle change in a vertical plane of the flat foil yarns 20 due to carrier movement with a cross point where the flat foil yarns 20 are continuously in contact with each other at two or more points as a reference point described in the explanation of the second inversion suppression requirement, and has succeeded in calculating within what range the magnitude should fall in relation to the inversion suppression.

Figure 6:
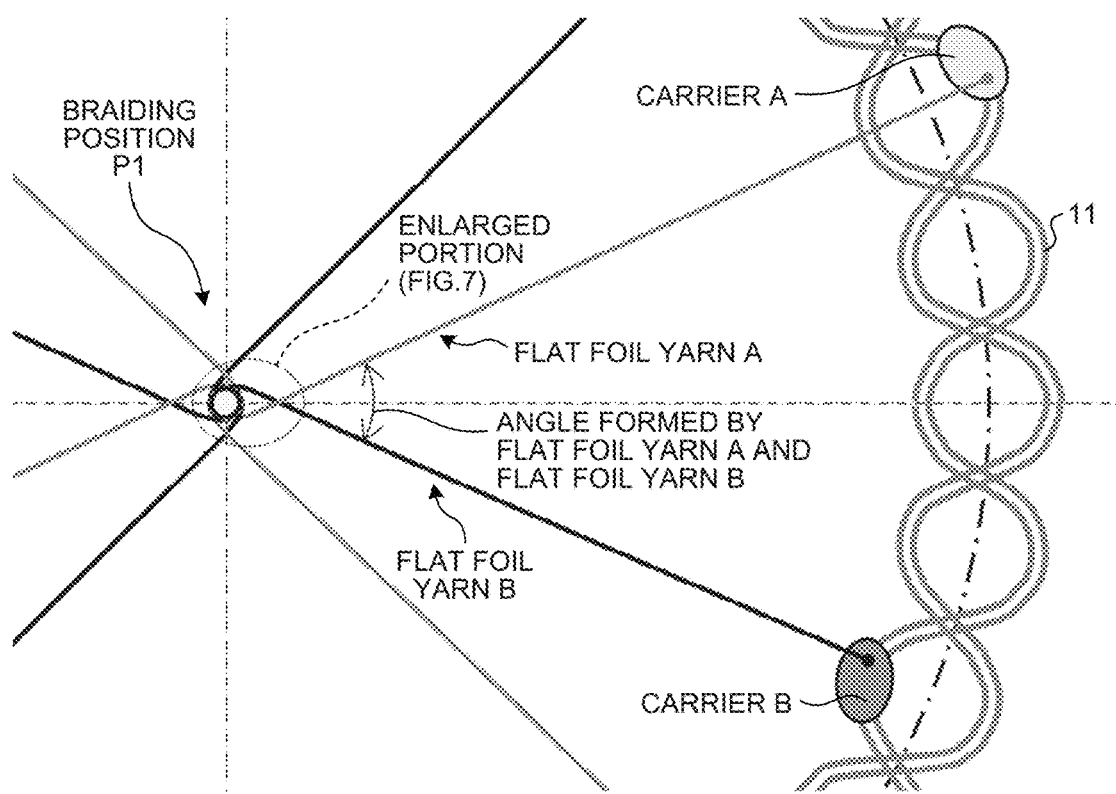
FIG. 6 is a diagram illustrating an arrangement when the carriers are at the "positions immediately after" illustrated in FIG. 3.

FIG. 6 illustrates an arrangement diagram when the carriers are at the "positions immediately after" as illustrated in FIG. 3. FIG. 4B is an enlargement of the braiding position P1 at this time, and the flat foil yarn A and the flat foil yarn B take positions farthest from each other in terms of angle, and the arrangement is under the worst condition for suppressing the inversion.

Figure 7:
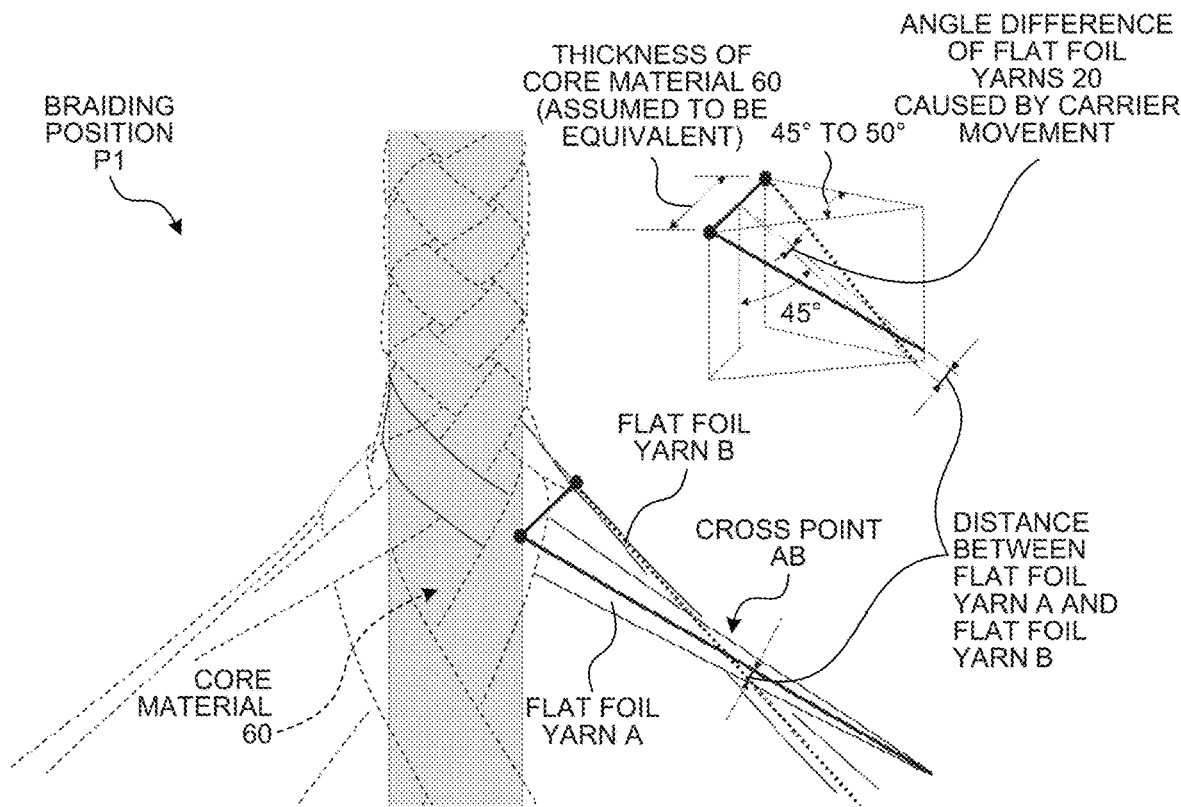
FIG. 7 is a diagram illustrating a geometrical arrangement when arrangement approximation calculation under a worst condition is performed.

FIG. 7 is a diagram illustrating a geometrical arrangement when arrangement approximation calculation under the worst condition is performed. Here, assuming a triangular pillar with two equilateral sides with respect to three cross points including the cross point AB formed by the flat foil yarn A and the flat foil yarn B, a crossing angle of the flat foil yarn A and the flat foil yarn B when viewed from directly above (see FIG. 6) is 45° to 50°, and the angle formed by the flat foil yarns 20 (flat foil yarns A and B) with respect to a vertical direction is 45°. Further, it is assumed that the flat foil yarns 20 are used capable of forming an outer conductor without a gap when the flexible waveguide 51 is assembled with eight of the flat foil yarns 20 with respect to a diameter of the core material 60, an angle is calculated at which half the width of each of the flat foil yarns 20 equals to the distances between the flat foil yarn A and the flat foil yarn B at the cross point AB. As a result, when the crossing angle when viewed from directly above is 45°, it is estimated that an angle difference of the flat foil yarns due to the carrier movement is 8.4°, and when the crossing angle is 50°, the difference is estimated to be 9.2°.

That is, based on these considerations, the present inventor has found that, in consideration of a case where the flat foul yarns 20 that are relatively narrow are used in the braider 1 for a waveguide outer conductor of the present embodiment, if the angle difference is about 10° or less, the force for suppressing inversion can be exerted, and at the same time, vibration and twisting that are the inversion factors can be suppressed.

In the braider 1 used in this example, the above conditions are actually satisfied, and the angle difference of the flat foil yarns 20 due to the carrier movement is about 9° to 10° (calculated to be greater than about 9.3°) by actual measurement.

The rubbing between the flat foil yarns 20 (flat foil yarns A and B) as in the third inversion factor is also unavoidable during the braiding operation, but the vibration, jumping, and twisting caused by rubbing can often be avoided by smoothing the surfaces (front and back sides) or cut surfaces of the flat foil yarns 20. However, in this example, the flat foil yarns 20 are manufactured by slitting a composite film composed of a metal foil and a resin film with a constant cutting width to continuous cut the composite film using a slitter having a plurality of rotary blades as described above, and the flat foil yarns 20 manufactured by this method have sufficiently smooth surfaces (front and back sides) or cut surfaces, and can suppress inversion.

Effect

According to the b-raider 1 for a waveguide outer conductor in the present embodiment, the flexible waveguide 51 having an outer conductor made of eight of the flat foil yarns 20 that are not inverted can be obtained.

First Comparative Example

In the same braider 1 as in the first example, four of the carriers 10 are set each including the cylindrical bobbin 30 around which a flat foil yarn having a width of 2.4 mm is wound so as not to be inverted, so as to configure the braider 1 for a waveguide outer conductor. Here, other configurations such as the core material supply mechanism 70, the waveguide take-out mechanism 80, and the like are the same as those in the first example, and the only difference is the width of the flat foil yarn and the number of the carriers 10.

When the braiding operation is performed with the above configuration, inversion occurs in the flat foil yarns, and the flexible waveguide 51 having an outer conductor without inversion cannot be obtained. This is because in the formation of the outer conductor by the four flat foil yarns of the configuration illustrated in the first comparative example, in the enlarged portion before the flat foil yarns form a braided shape as illustrated in the first example, only one cross point or at most two cross points can be obtained between the respective flat foil yarns and other flat foil yarns.

That is, in the round braid braider using the four flat foil yarns in the first comparative example, the effect of suppressing inversion by the cross points cannot be obtained, and the flexible waveguide 51 without inversion cannot be obtained.

Second Comparative Example

An ultrafine flexible print circuit (FPC) obtained by cutting an FPC in which a copper wiring is included, with a width of 1.2 mm using a laser is wound around the cylindrical bobbin 30 so that there is no inversion, and set in each of the eight carriers 10 similar to those in the first example. Further, the carriers 10 are installed in the braider 1 for a waveguide outer conductor of the first example so as to configure a braider for a waveguide outer conductor. Here, the only difference from the first example is that while in the first example, the flat foil yarns 20 are manufactured by slitting a composite film composed of a metal foil and a resin film, with a constant cutting width to continuous cut the composite film using a slitter having a plurality of rotary blades, in the second comparative example, the ultrafine FPC cut by using a laser is used.

When the braiding operation is performed with the above configuration, inversion occurs in the ultrafine FPC, and a waveguide having an outer conductor without inversion cannot be obtained. This is because the ultrafine FPC that is used is cut using a laser, so smooth cut surfaces cannot be obtained, and unnecessary jumping and twisting occur when the yarns rub against each other during the braiding operation.

That is, in the round braid braider using the flat foil yarns manufactured by laser cutting in the second comparative example, it is not possible to suppress unnecessary jumping that causes inversion, and the flexible waveguide 51 without inversion cannot be obtained.

Third Comparative Example

In a braider that can use up to 16 of the carriers 10, eight of the carriers 10 are set each including the cylindrical bobbin 30 around which the flat foil yarn 20 is wound so as not to be inverted, and the core material supply mechanism 70 for supplying the core material 60 to be placed inside a waveguide and the waveguide take-out mechanism 80 for winding the waveguide at a constant speed after an outer conductor is formed are installed so as to configure a braider for a waveguide outer conductor. Here, the carriers 10 and the flat foil yarn 20 are the same as those used in the first example, and the core material supply mechanism 70 and the waveguide take-out mechanism 80 according to the first example are also installed.

Figure 8:
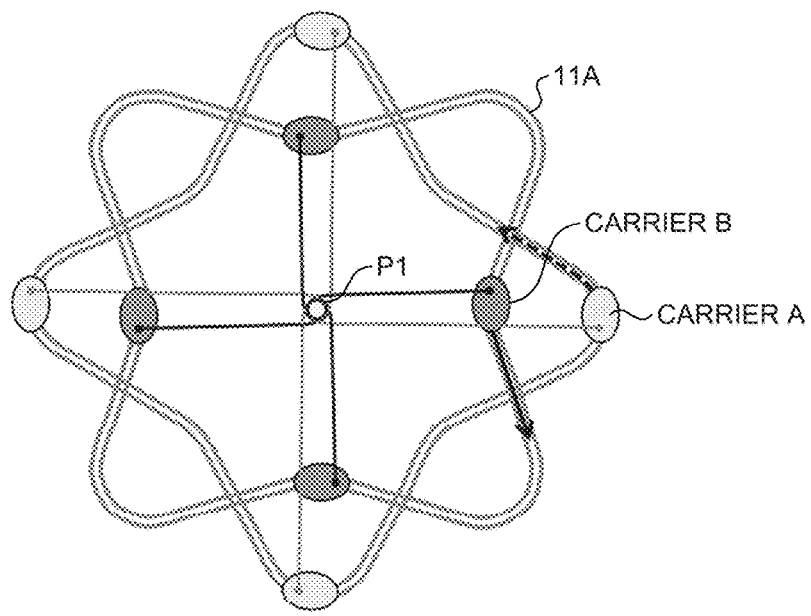
FIG. 8 is a conceptual diagram when the braider of an example is viewed from above, and is a diagram illustrating a rail of the round braid braider of the example and paths for the carriers to move on the rail.

FIG. 8 is a conceptual diagram when the braider of this example is viewed from above, and illustrates a rail 11A of the round braid braider of this example and paths for the carriers 10 to move on the rail 11A. As in the first example, the rail 11A has a rail for clockwise rotation and a rail for counterclockwise rotation, and these rails have tracks that make one rotation around a braiding position while crossing with each other. Eight carriers include four of the carriers 10 that rotate counterclockwise (carrier A) and four of the carriers 10 that rotate clockwise (carrier B), the flat foil yarn 20 is stretched from each of the carriers toward the braiding position, and the carriers move on the rail 11A. The carriers 10 are arranged at equal intervals as illustrated in DIG. 8, and the carriers A and the carriers B move on the rail 11A while meandering by the crossing tracks of the rails 11A.

When the braiding operation is performed with the above configuration, inversion occurs in the flat foil yarns 20, and a waveguide having an outer conductor without inversion cannot be obtained. As is clear from a comparison between FIGS. 3 and 8, the meandering of the carriers 10 in the third comparative example is larger than that of the first example, and vibration and twisting of the flat foil yarns 20 generated by the meandering of the carriers 10 exceed the force for suppressing inversion.

The angle difference of the flat foil yarns 20 due to the carrier movement in the braider used in the third comparative example is about 25°, and greatly exceeds the reference within 10° illustrated as the angle at which inversion can be suppressed in the first example.

That is, in the braider illustrated in the third comparative example, the flat foil yarns 20 vibrate and twist greatly due to the meandering of the carriers 10, and the flexible waveguide 51 without inversion cannot be obtained.

Second Example

Configuration and Action

In the same braider as in the first example, 16 of the carriers 10 are set each including the cylindrical bobbin 30 around which a flat foil yarn having a width of 0.6 mm is wound so as not to be inverted, so as to configure a braider for a waveguide outer conductor. Here, other configurations such as the core material supply mechanism 70, the waveguide take-out mechanism 80, and the like are the same as those in the first example, and the only difference is the width D1 of the flat foil yarn and the number of the carriers 10.

Figure 9A:
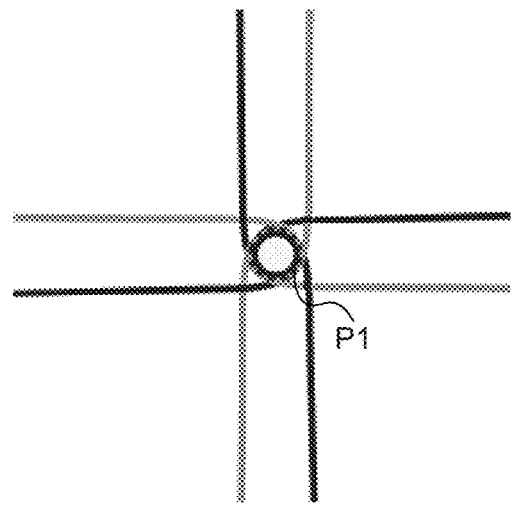
FIG. 9A is a conceptual diagram when the braiding position is viewed from above.
Figure 9B:
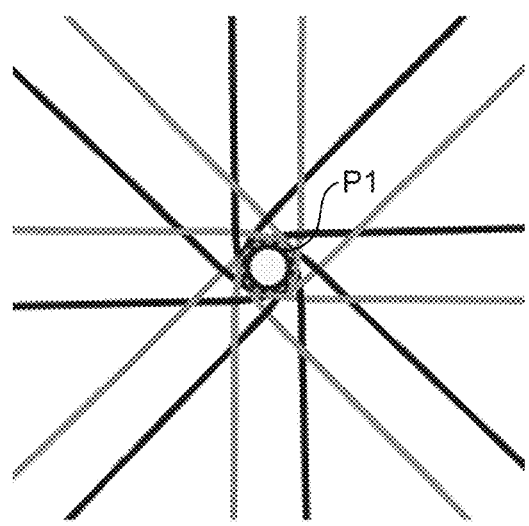
FIG. 9B is a conceptual diagram when the braiding position is viewed from above.
Figure 9C:
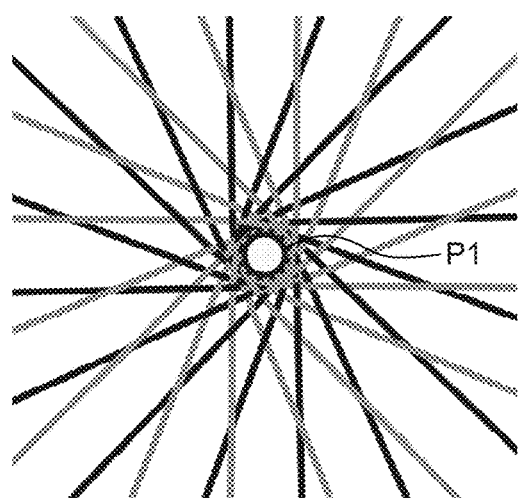
FIG. 9C is a conceptual diagram when the braiding position is viewed from above.

When the braiding operation is performed with the above configuration, the flexible waveguide 51 having an outer conductor without inversion in the flat foil yarns 20 can be obtained. This is because in the outer conductor formation by 16 of the flat foil yarns 20 having the configuration illustrated in the second example, more cross point can be stably obtained than the first example in the enlarged portion before the flat foil yarns 20 form a braided shape as illustrated in the first example. This is clear from the comparison between the case of the second example of FIG. 9B and the case of the first example illustrated in FIG. 9A in the conceptual diagram when the braiding position P1 of FIGS. 9A to 9C is viewed from above.

That is, in the round braid braider using 16 of the flat foil yarns 20 of the second example, the flexible waveguide 51 without inversion can be obtained by sufficiently obtaining the effect of suppressing inversion by cross points.

Third Example

Configuration and Action

In the same round braid braider 1 as in the first example, 32 of the carriers 10 are set each including the cylindrical bobbin 30 around which each flat foil yarn 20 having a width of 0.3 mm is wound so as not to be inverted, so as to configure a braider for a waveguide outer conductor. Here, other configurations such as the core material supply mechanism 70, the waveguide take-out mechanism 80, and the like are the same as those in the first example, and the only difference is the width of the flat foil yarns 20 and the number of the carriers 10.

Figure 10:
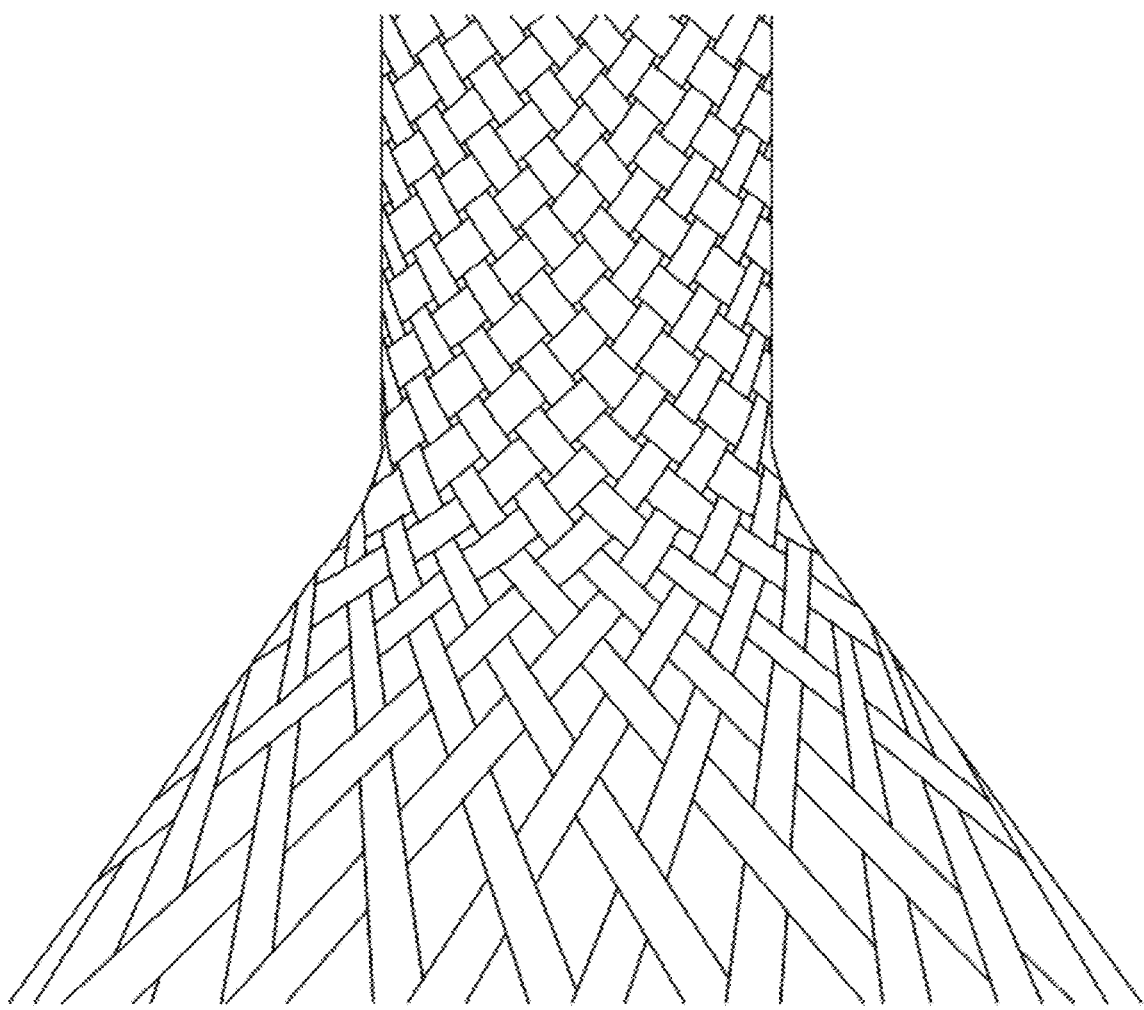
FIG. 10 is a conceptual diagram of the braiding position.

When the braiding operation is performed with the above configuration, the flexible waveguide 51 having an outer conductor without inversion in the flat foil yarns 20 can be obtained. This is because in the outer conductor formation by 32 of the flat foil yarns 20 having the configuration illustrated in the third example, more cross point can be stably obtained than the first example in the enlarged portion before the flat foil yarns 20 form a braided shape as illustrated in the first example. This is clear from the comparison between the case of the third example of FIG. 9C and the case of the first example illustrated in FIG. 9A in the conceptual diagram when the braiding position of FIG. 10 is viewed from a side.

That is, in the round braid braider 1 using 32 of the flat foil yarns 20 of the third example, the flexible waveguide 51 without inversion can be obtained by sufficiently obtaining the effect of suppressing inversion by cross points.

Fourth Example

Figure 11:
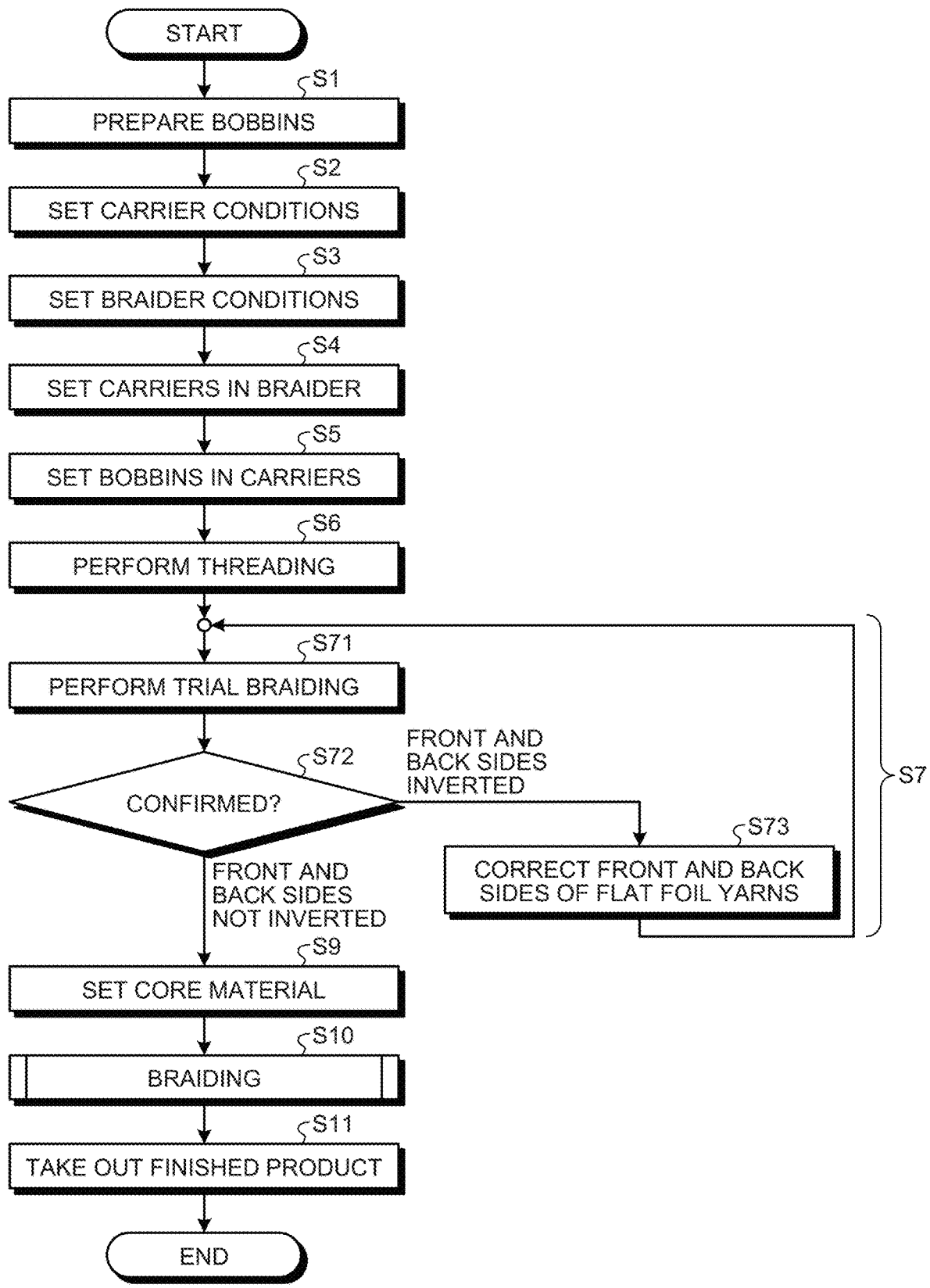

As a fourth example, a method of manufacturing the flexible waveguide 51 of the present disclosure will be described. FIG. 11 is a flowchart illustrating a process of a method of manufacturing the flexible waveguide 51.

Constitution

The method of manufacturing the flexible waveguide 51 of the fourth example is a method of manufacturing the flexible waveguide 51 including a flexible dielectric rod and an outer conductor formed of the flat foil yarns 20 braided on an outer periphery of the flexible dielectric rod, and includes a step of forming an outer conductor using the round braid braider 1 for a waveguide outer conductor according to the third example (step S10 in FIG. 11) and a step of confirming and matching front and back sides of the flat foil yarns 20 before the step of forming the outer conductor (step S7 in FIG. 11).

The flat foil yarns 20 referred to here are manufactured by continuously cutting a composite film obtained by laminating a polyimide film having a thickness of 25 μm and a copper foil having a thickness of 9 μm, to a width of 0.3 mm by a slitter having a plurality of rotary blades. Further, the front and back sides of the flat foil yarn 20 here are such that a one same surface of the composite film before being cut is the front side of the flat foil yarn 20 and another same surface of the composite film before being cut is the back side of the flat foil yarn 20. The front and back sides of the flat foil yarn 20 here are for convenience only, but in the fourth example, the polyimide film surface is indicated as the front side of the flat foil yarn 20 and the copper foil surface is indicated as the back side of the flat foil yarn 20.

In the flexible waveguide 51 manufactured in this example, an outer conductor is formed so that the back side (copper foil surface) of the flat foil yarn 20 is on the inside of the outer conductor to be formed. In order to realize this, the step of confirming and matching the front and back sides of the flat foil yarns 20 (step S7 in FIG. 11) includes a step of confirming the presence or absence of the flat foil yarns 20 that are inverted by trial braiding (step 371 and step S72 in FIG. 11), and a step of correcting the front and back sides of the flat foil yarns 20 (step 373 in FIG. 11)

Action

Hereinafter, the method of manufacturing the flexible waveguide 51 illustrated in FIG. 11 will be described step by step.

In the method of manufacturing the flexible waveguide 51 using the braider 1 for a waveguide outer conductor in this example, it is necessary to prepare the required number of the cylindrical bobbins 30 around which the flat foil yarns 20 are wound so as not to be inverted. Therefore, an operation is performed for winding the flat foil yarns 20 each having a width of 0.3 mm around the cylindrical bobbins 30 that can be set in the carriers 10 used in this example so as not to be inverted using a dedicated yarn winding facility (not illustrated) (step S1 of FIG. 11). As a result, 32 of the bobbins 30 are obtained around which the flat foil yarns 20 are wound so as not to be inverted.

Next, the mechanisms 112 for keeping the tension of the carriers 10 to be used constant are adjusted to meet conditions for 32 of the carriers to be used (step S2 in FIG. 11). Further, conditions for the carrier movement determination mechanism 90 for carrier speed for the braider 1 and the like, and speed conditions for the waveguide take-out mechanism 80 to pull up the flexible waveguide 51 that is finished are determined and set in association with each other (step S3 in FIG. 11). The conditions set up to this point can be adjusted while observing the results of the trial braiding, and can be changed later.

Now that the prerequisites are met, the carriers 10 are set in the round braid braider 1 of this example (step S4 in FIG. 11), and further, the bobbins 30 are set in the carriers 10 (step S5 in FIG. 11. From each of the set bobbins 30, each of the flat foil yarns 20 is taken out, passed through the pulley mechanism 113 and a guide 115 of each of the carriers 10 in order, and guided to the braiding position P1, and the flat foil yarns 20 are assembled so as to form a braided shape (step S6 in FIG. 11).

When all the yarns are assembled, trial braiding is performed (step S71 in FIG. 11). If the copper foil surface (back side) of the yarn is exposed to the outside (front side), the yarn is cut once to correct the sides. After the front and back sides of the yarns are corrected, the yarns are reassembled. By repeating the process of confirming the front and back sides of the flat foil yarns 20 and matching the front and back sides, it is possible to bring all the flat foil yarns 20 constituting the flexible waveguide 51 into a state in which the front and back sides match.

After the front and back sides of all the flat foil yarns 20 match and the braiding is stabilized, the core material 60 (flexible dielectric rod) to be placed inside the waveguide is pulled out from the core material supply mechanism 70 included in the round braid braider 1 for a waveguide outer conductor used in this example to the braiding position P1 and inserted into the inside of the waveguide to be formed (step S9 in FIG. 11).

Now that the flexible waveguide 51 is ready to be manufactured, the flexible waveguide 51 is formed under preset manufacturing conditions (step S10 in FIG. 11).

The flexible waveguide 51 where an outer conductor has been formed is pulled out from the braiding position P1 by the waveguide take-out mechanism 80 included in the round braid braider 1 for a waveguide outer conductor used in this example, and taken out as a finished product (step S11 in FIG. 11).

Effect

Figure 12:
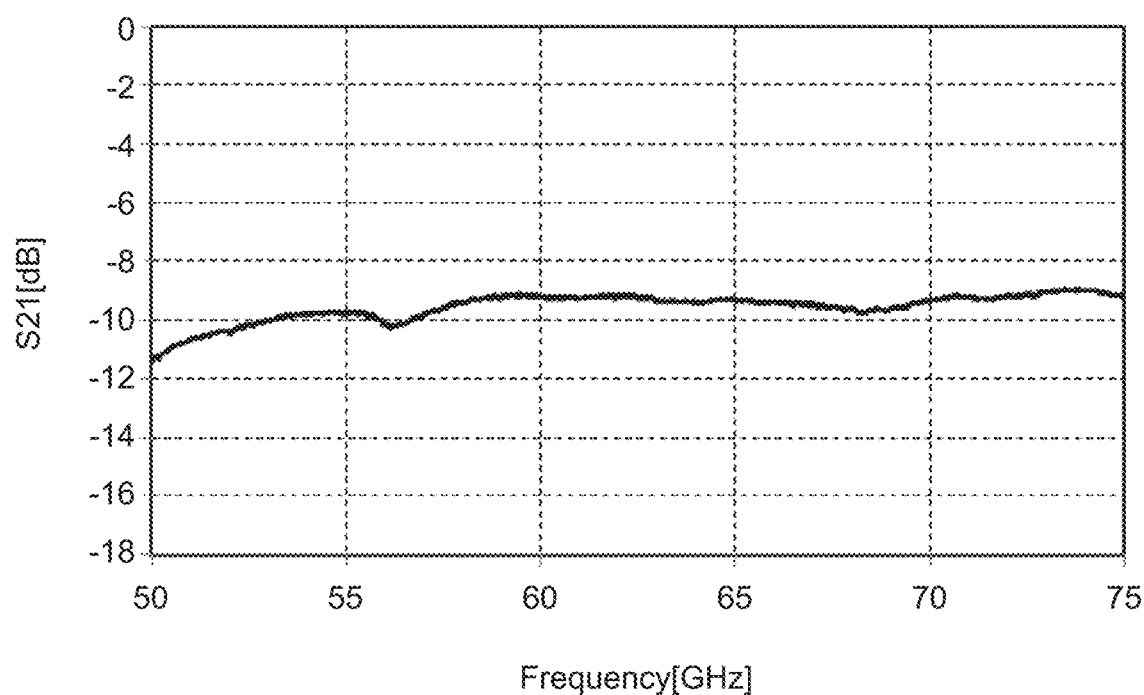
FIG. 12 is a diagram illustrating a result of measuring transmission characteristics of a 1.2 m flexible waveguide obtained by the manufacturing method of an example, using a vector network analyzer.

FIG. 12 illustrates a result (including connection loss) of measuring transmission characteristics of the flexible waveguide 51 having a length of 1.2 m obtained by the manufacturing method of this example, using a vector network analyzer. As illustrated in FIG. 12, according to the manufacturing method of this example, the flexible waveguide 51 having sufficiently small loss and stable characteristics can be obtained.

Fifth Example

Configuration and Action

Figure 13:
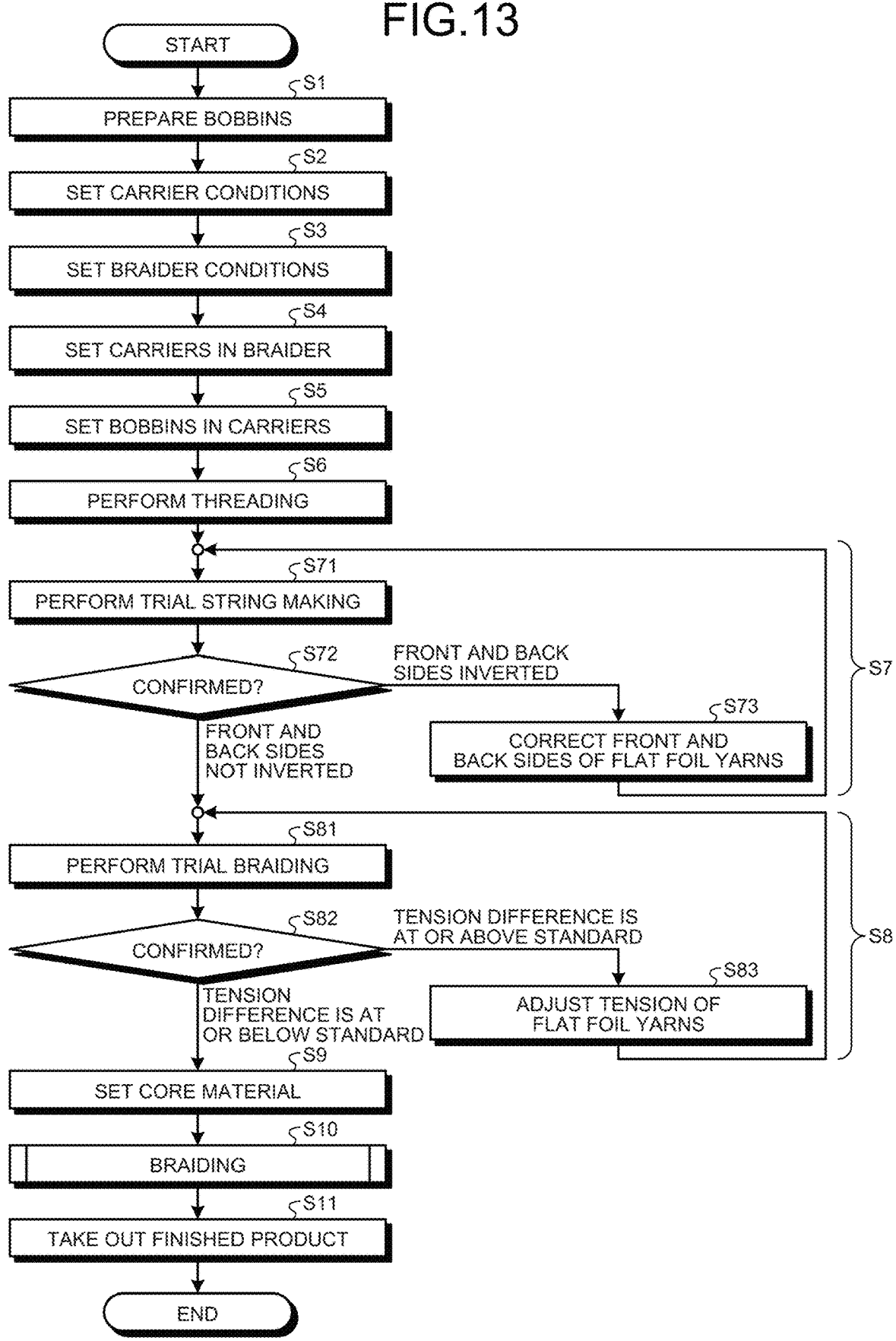
FIG. 13 is a flowchart illustrating a process of a method of manufacturing a flexible waveguide according to a fifth example.

FIG. 13 is a flowchart illustrating a process of a method of manufacturing a flexible waveguide according to a fifth example. The method of manufacturing the flexible waveguide 51 of the fifth example is a method of manufacturing the flexible waveguide 51 including a flexible dielectric rod and an outer conductor formed of the flat foil yarns 20 braided around the flexible dielectric rod, and in addition to the steps of the manufacturing method of the fourth example, includes a step of adjusting the tension of the flat foil yarns 20 (step S8 in FIG. 13). Further, the braider 1 for a waveguide outer conductor used in the fifth example uses the carriers 10 including mechanisms for adjusting the tension of the flat foil yarns 20. The carriers 10 are sufficiently adjusted so that the tension of the flat foil yarns 20 can be kept constant in carrier condition setting (step S2 in FIG. 13).

In the manufacturing method of the fifth example, an outer conductor is formed so that the tension of the flat foil yarns 20 constituting the braided outer conductor is constant. In order to realize this, the step of adjusting the tension of the flat foil yarns 20 (step S8 in FIG. 13) includes a step of determining the carriers 10 in which tension differences occur by trial braiding (step S81 and step S82 in FIG. 3), and a step of adjusting the tension of the flat foil yarns 20 by using the mechanisms in the carriers 10 for adjusting the tension of the flat foil yarns 20 (step S83 of FIG. 13).

The step of adjusting the tension of the flat foil yarns 20 (step S8 in FIG. 13) is performed after the front and back sides of all the flat foil yarns 20 constituting the flexible waveguide 51 match by the step of confirming and matching the front and back sides of the flat foil yarns 20 (step S7 in FIG. 13). First, trial braiding is performed (step S81 in FIG. 13), and the flat, foil yarns 20 having tension differences are determined from an appearance of the braid-shaped flexible waveguide 51 formed in this step, and corrections are made using the mechanisms 112 in the carriers 10 for adjusting the tension of the flat foil yarns 20. By repeating the step of adjusting the tension of the flat foil yarns 20, the tension of all the flat foil yarns 20 constituting the flexible waveguide 51 can be adjusted to match.

Here, the appearance of the flexible waveguide 51 is used to determine the carriers 10 and the flat foil yarns 20 having tension differences. However, it is also possible to use the carriers 10 having the mechanisms 112 for measuring the tension and adjust the tension based on measurement values, and thus the method is not limited to this.

Although in the carrier condition setting step (step S2 in FIG. 13) in the fifth example, the tension of the flat foil yarns 20 is sufficiently adjusted so that the tension can be kept constant, the step of adjusting the tension of the flat foil yarns 20 (step S8 in FIG. 13) is required. This is because it is difficult to completely match rotational friction of the bobbins 30 on the carriers 10, friction of the pulley mechanisms 113 and the guides 115 of the carriers 10, and spring constants of the springs, and thus it is difficult to sufficiently match the tension during the actual braiding operation only by a previous adjustment.

Effect

Figure 14:
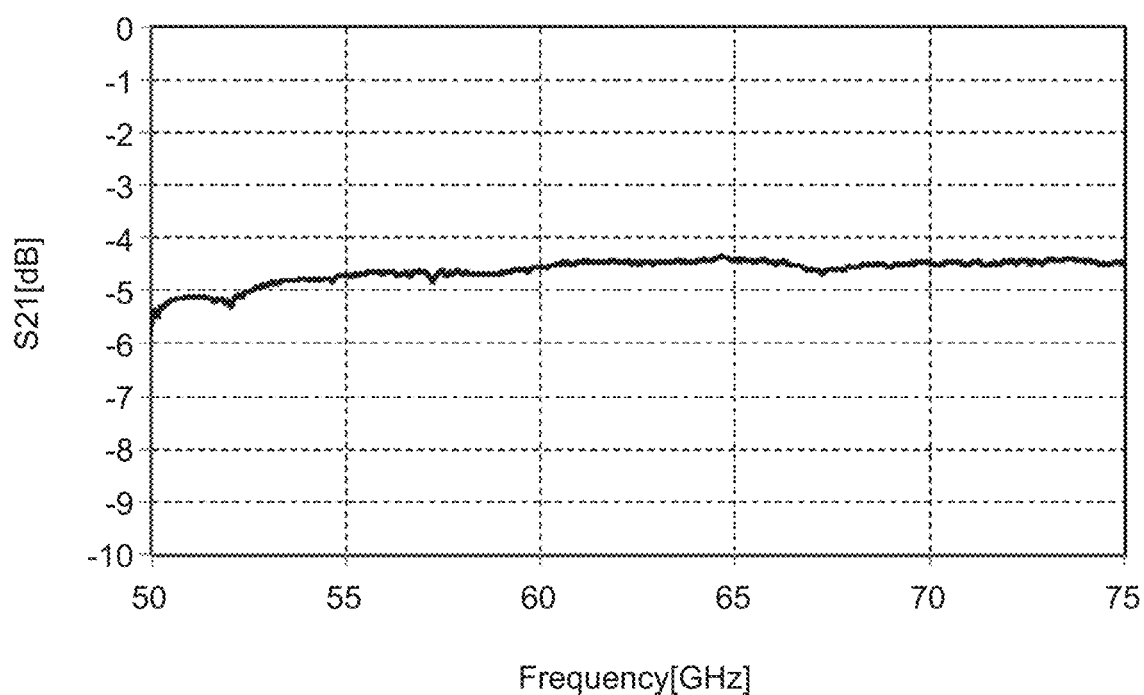
FIG. 14 is a diagram illustrating a result of measuring transmission characteristics of a 0.5 m flexible waveguide obtained by the manufacturing method of the fifth example, using a vector network analyzer.

FIG. 14 illustrates the result (including connection loss) of measuring transmission characteristics of the flexible waveguide 51 having a length of 0.5 m obtained by the manufacturing method of the fifth example, using a vector network analyzer. Here, it can be seen that disturbance of the transmission characteristics illustrated in the result of the fourth example (FIG. 12) is reduced, and the flexible waveguide 51 having more desirable characteristics is obtained.

That is, according to the manufacturing method of the firth example, the flexible waveguide 51 having more stable characteristics can be obtained.

In the description of a flowchart in the present specification, the context of processing between steps is clarified by using expressions such as "first", "after", and "subsequently", but an order of processing required for carrying out the disclosure is not uniquely defined by those expressions. That is, the order of processing in the flowchart described in the present specification can be changed within a consistent range.

According to the present disclosure, there is an effect that a manufacturing apparatus can be obtained for manufacturing a round braid for a waveguide outer conductor that does not invert front and back sides of flat foil yarns, which is necessary for putting the flexible waveguide disclosed in Japanese Patent No. 6341327 into practical.

Further, according to the present disclosure, there is an effect that a flexible waveguide having stable characteristics can be obtained by a manufacturing method using the manufacturing apparatus for a round braid for a waveguide outer conductor.

Additional advantages and modifications will readily occur to those ski-led in the art. Therefore, the disclosure in its broader aspects is not limited to the specific details and representative embodiments shown and described herein. Accordingly, various modifications may be made without departing from the spirit or scope of the general concept as defined by the appended claims and their equivalents.

What is claimed is:

1. A braider of forming an outer conductor of a flexible waveguide by braiding flat foil yarns that are obtained by slitting a composite film composed of a metal foil and a resin film with a constant cutting width, the braider comprising:
   a plurality of cylindrical bobbins around which the flat foil yarns are wound so as not to be inverted;
   a plurality of carriers to which the bobbins are rotatably attached, the plurality of carriers being configured to feed out the flat foil yarns from the bobbins;
   a core material supply mechanism configured to supply a core material to be placed inside the outer conductor;
   a waveguide take-out mechanism configured to take out the flexible waveguide after the outer conductor is formed; and
   a carrier movement determination mechanism configured to determine movement of the carriers so that there are always three or more cross points formed by the individual flat foil yarns with other ones of the flat foil yarns in an enlarged portion before the flat foil yarns form a braided shape.

2. The braider according to claim 1, wherein an operation of the carrier movement determination mechanism is determined so that the three or more cross points include at least two cross points where two of the flat foil yarns that cross each other during a braiding operation are continuously in contact with each other at two or more points, and at a next cross point outside an outermost cross point of the at least two cross points, two of the flat foil yarns crossing each other are in contact with each other or are located so that a distance between the two of the flat foil yarns crossing each other is less than approximately half of a width of each of the two of the flat foil yarns crossing each other, the next cross point being included in the three or more cross points.

3. The braider according to claim 1, comprising: eight or more of the carriers and the bobbins around which the flat foil yarns are wound; and
eight or more of the flat foil yarns, wherein
an angle change is about 10 degrees or less in a vertical plane of the flat foil yarns, the angle change being caused by the movement of the carriers with a cross point where two of the flat foil yarns that cross each other during a braiding operation are continuously in contact with each other at two or more points as a reference point.

4. The braider according to claim 1, wherein the flat foil yarns is manufactured by continuous cutting the composite film using a slitter having a plurality of rotary blades.

5. The braider according to claim 1, wherein the plurality of carriers are configured to acquire the flat foil yarns from lateral sides of the bobbins with the bobbins rotating around rotation axes of the bobbins when the flat foil yarns are fed from the bobbins.

6. The braider according to claim 1, wherein front and back sides of the flat foil yarns are set so that a same surface of the composite film before being cut is on an outside or inside of the outer conductor to be formed.

7. A method of manufacturing a flexible waveguide including a flexible dielectric rod and an outer conductor, the outer conduct or being formed by braiding flat foil yarns on an outer periphery of the flexible dielectric rod, the method comprising:
forming the outer conductor using the braider according to claim 6; and
matching front and back sides of the flat foil yarns before the forming of the outer conductor.

8. The method of manufacturing a flexible waveguide according to claim 7, wherein
the matching of the front and back sides of the flat foil yarns includes
identifying the flat foil yarns that are inverted by trial braiding, and
correcting the front and back sides of the flat foil yarns.

9. The braider according to claim 1, wherein the plurality of carriers include mechanisms configured to keep tension of the flat foil yarns constant.

10. The braider according to claim 1, wherein the plurality of carriers include mechanisms configured to adjust tension of the flat foil yarns.

11. A method of manufacturing a flexible waveguide including a flexible dielectric rod and an outer conductor, the outer conductor being formed by braiding flat foil yarns on an outer periphery of the dielectric rod, the method comprising:
forming the outer conductor using the braider according to claim 10; and
adjusting tension of the flat foil yarns before the forming of the outer conductor.

12. The method of manufacturing a flexible waveguide according to claim 11, wherein
the adjusting of the tension of the flat foil yarns includes
determining carriers having tension differences by trial braiding, and
adjusting tension of the flat foil yarns using mechanisms configured to adjust the tension of the flat foil yarns, the mechanisms being included in the carriers.

13. A b-raider of forming a cylindrical member by braiding a plurality of strip members, the braider comprising:
a plurality of cylindrical bobbins around which the strip members are wound so as not to be inverted;
a plurality of carriers to which the bobbins are rotatably attached, the plurality of carriers being configured to feed the strip members out from the bobbins; and
a carrier movement determination mechanism configured to determine movement of the plurality of carriers so that there are always three or more cross points formed by the individual strip members with other ones of the strip members in an enlarged portion before the strip members form a braided shape.

14. The braider according to claim 13, wherein an operation of the carrier movement determination mechanism is determined so that the three or more cross points include at least two cross points where two of the strip members that cross each other during a braiding operation are continuously in contact with each other at two or more points, and at a next cross point outside an outermost cross point of the at least two cross points, two of the strip members crossing each other are in contact with each other or are located so that at a distance between the two of the strip members crossing each other is less than approximately half of a width of each of the two of the strip members crossing each other, the next cross point being included in the three or more cross points.

15. The braider according to claim 13, comprising: eight or more of the carriers and the bobbins around which the strip members are wound; and
eight or more of the strip members, wherein
an angle change is about 10 degrees or less in a vertical plane of the strip members, the angle change being caused by the movement of the carriers with a cross point where two of the strip members that cross each other during a braiding operation are continuously in contact with each other at two or more points as a reference point.

* * * * *